(12) United States Patent
Orosa et al.

(10) Patent No.: US 9,032,721 B2
(45) Date of Patent: May 19, 2015

(54) GAS TURBINE ENGINE EXHAUST DIFFUSER INCLUDING CIRCUMFERENTIAL VANE

(75) Inventors: John A. Orosa, Palm Beach Gardens, FL (US); Pawel Matys, Jupiter, FL (US)

(73) Assignee: Siemens Energy, Inc., Orlando, FL (US)

( * ) Notice: Subject to any disclaimer, the term of this patent is extended or adjusted under 35 U.S.C. 154(b) by 825 days.

(21) Appl. No.: 13/325,178

(22) Filed: Dec. 14, 2011

(65) Prior Publication Data

US 2013/0152592 A1  Jun. 20, 2013

(51) Int. Cl.
  *F02K 1/38* (2006.01)
  *F01D 25/30* (2006.01)

(52) U.S. Cl.
  CPC ........ *F01D 25/305* (2013.01); *F05D 2240/122* (2013.01); *F02K 1/386* (2013.01); *F02K 1/38* (2013.01); *F05D 2270/173* (2013.01)

(58) Field of Classification Search
  CPC .................. F05D 2240/122; F05D 2240/129; F02K 1/00; F02K 1/002; F02K 1/28; F02K 1/30; F02K 1/34; F02K 1/38; F02K 1/386; F02K 1/46; F01D 9/04
  USPC ............ 60/770, 771, 265, 762, 262, 751, 231
  See application file for complete search history.

(56) References Cited

U.S. PATENT DOCUMENTS

| | | | |
|---|---|---|---|
| 2,885,160 A | 5/1959 | Griswold, II | |
| 3,337,121 A | 8/1967 | Coanda | |
| 3,540,216 A * | 11/1970 | Ratko et al. | 60/762 |
| 4,215,536 A * | 8/1980 | Rudolph | 60/262 |
| 4,457,480 A | 7/1984 | Englar et al. | |
| 4,682,746 A | 7/1987 | Thomas | |
| 5,097,660 A | 3/1992 | Shekleton | |
| 5,863,090 A | 1/1999 | Englar | |
| 7,290,738 B1 | 11/2007 | Rogers et al. | |
| 2011/0058939 A1 | 3/2011 | Orosa et al. | |

FOREIGN PATENT DOCUMENTS

| | | |
|---|---|---|
| DE | 3210498 A1 | 10/1983 |
| EP | 1298286 A2 | 4/2003 |
| GB | 702273 A | 1/1954 |

* cited by examiner

*Primary Examiner* — Andrew Nguyen

(57) ABSTRACT

A flow passage defined between an inner and an outer boundary for guiding a fluid flow in an axial direction. A flow control vane is supported at a radial location between the inner and outer boundaries. A fluid discharge opening is provided for discharging a flow of the compressed fluid from a trailing edge of the vane, and a fluid control surface is provided adjacent to the fluid discharge opening and extends in the axial direction at the trailing edge of the vane. The fluid control surface has a curved trailing edge forming a Coanda surface. The fluid discharge opening is selectively provided with a compressed fluid to produce a Coanda effect along the control surface. The Coanda effect has a component in the radial direction effecting a turning of the fluid flow in the flow path radially inward or outward toward one of the inner and outer boundaries.

17 Claims, 3 Drawing Sheets

GAS TURBINE ENGINE EXHAUST DIFFUSER INCLUDING CIRCUMFERENTIAL VANE

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

The invention relates in general to turbine engines and, more particularly, to exhaust diffusers for turbine engines.

BACKGROUND OF THE INVENTION

Referring to FIG. 1, a turbine engine 10 generally includes a compressor section 12, a combustor section 14, a turbine section 16 and an exhaust section 18. In operation, the compressor section 12 can induct ambient air and can compress it. The compressed air from the compressor section 12 can enter one or more combustors 20 in the combustor section 14. The compressed air can be mixed with the fuel, and the air-fuel mixture can be burned in the combustors 20 to form a hot working gas. The hot gas can be routed to the turbine section 16 where it is expanded through alternating rows of stationary airfoils and rotating airfoils and used to generate power that can drive a rotor 26. The expanded gas exiting the turbine section 16 can be exhausted from the engine 10 via the exhaust section 18.

The exhaust section 18 can be configured as a diffuser 28, which can be a divergent duct formed between an outer shell 30 and a center body or hub 32 and a tail cone 34. The exhaust diffuser 28 can serve to reduce the speed of the exhaust flow and thus increase the pressure difference of the exhaust gas expanding across the last stage of the turbine. In some prior turbine exhaust sections, exhaust diffusion has been achieved by progressively increasing the cross-sectional area of the exhaust duct in the fluid flow direction, thereby expanding the fluid flowing therein.

It is preferable to minimize disturbances in the exhaust diffuser fluid flow; otherwise, the performance of the diffuser 28 can be adversely affected. Such disturbances in the fluid flow can arise for various reasons, including, for example, boundary layer separation. If fluid flow proximate a diffuser wall (the boundary layer) separates from the wall, there is a loss in the diffusing area and an increase in total pressure loss resulting in reduced pressure recovery. Generally, the larger the angle of divergence in a diffuser, the greater the likelihood that flow separation will occur.

One approach to minimizing flow separation is to provide a diffuser with a relatively long hub. A long hub can maximize performance by delaying the dump losses—flow losses that occur at the downstream end of the hub/tail cone—to a point when the exhaust gases are traveling at a lower velocity, thereby minimizing the strength of the tail cone's wakes in the flow. However, a long hub presents a disadvantage in that it can make the engine design more complicated and expensive. For instance, a longer hub typically requires two rows of support struts 36—one in an upstream region of the hub 32 and one in a downstream region of the hub 32, as shown in FIG. 1. These support struts 36 can increase cost and the risk of material cracking due to thermal mismatch between inner and outer flowpath parts or vibratory loads. Further, long hubs can pose challenges in instances where available space is limited.

Another approach to minimizing flow separation losses is to provide a diffuser with a relatively short hub length followed by a reduced divergence angle. This approach can minimize cost by, among other things, requiring only a single row of support struts. However, diffuser performance may suffer because this design can often lead to high dump losses from having the hub end (sudden expansion) further upstream in the diffuser where the flow velocities are higher. To avoid a second set of struts, associated tail cones are often steep, causing wakes to form in the flow downstream of the tail cone which can continue to grow downstream.

Thus, there is a need for an exhaust diffuser that can achieve the performance benefits of a long hub design while enjoying the reduced cost and risk of a short hub design.

SUMMARY OF THE INVENTION

In accordance with an aspect of the invention, a flow passage is provided for an axial flow machine. The flow passage comprises an inner boundary and an outer boundary radially spaced from the inner boundary so that an annular flow path for guiding a fluid flow in an axial direction is defined therebetween, and including a source of compressed fluid. A flow control vane is provided including leading and trailing edges. The vane is supported at a radial location between the inner and outer boundaries. A fluid discharge opening is provided for discharging a flow of the compressed fluid from the trailing edge, and a fluid control surface is provided adjacent to the fluid discharge opening and extends in the axial direction at the trailing edge of the vane. The fluid control surface has a curved trailing edge forming a Coanda surface. The fluid discharge opening is selectively provided with the compressed fluid from the source of compressed fluid to produce a Coanda effect along the control surface, the Coanda effect having a component in the radial direction effecting a turning of the fluid flow in the flow path radially inward or outward toward one of the inner and outer boundaries.

Further aspects of the invention may include providing the source of compressed fluid located outside of the flow passage, and including a plenum located within the vane in fluid communication with the source of compressed fluid, and providing a flow of the compressed fluid to the fluid discharge opening. The vane may extend circumferentially within the flow path, and the fluid discharge opening may comprise a first fluid discharge opening located on a radially outward facing side of the vane, and a second fluid discharge opening located on a radially inward facing side of the vane. The first and second fluid discharge openings may be located adjacent to respective radially facing sides of the fluid control surface. The first and second fluid discharge openings may be located in fluid communication with the plenum to selectively provide a majority of a compressed fluid flow to either one of the first and second fluid discharge openings. When the majority of compressed fluid flow is provided to the first fluid discharge opening, the Coanda effect along said control surface may effect a radial inward turning of the fluid flow in the flow path, and when the majority of compressed fluid flow is provided to the second fluid discharge opening, the Coanda effect along said control surface may effect a radial outward turning of the fluid flow in the flow path.

The fluid control surface may comprise opposing first and second radially facing portions that may be generally symmetrical about a plane extending axially from the leading edge to the trailing edge of the vane.

The vane may be supported on a strut structure and the strut structure may include laterally opposing sides that may be intersected by the flow control vane.

The flow control vane may comprise a first flow control vane and the radial location may comprise a first radial location, and a second flow control vane may be located at a second radial location, radially outward from the first vane, between the inner and outer boundaries. The outer boundary may diverge at a predetermined angle, and at least one of the first and second control vanes may define a chordal axis between the leading edge and the trailing edge, the chordal axis being oriented in a direction generally parallel to the predetermined angle.

The inner boundary may include a tail cone having a conical surface tapering radially inward toward a central axis of the flow path, and the trailing edge of the flow control vane may be substantially aligned, in the axial direction, with at least a portion of the tail cone.

In accordance with another aspect of the invention, a flow passage is provided comprising an exhaust diffuser in a gas turbine engine. The flow passage comprises an inner boundary defined by an exhaust diffuser hub, and an outer boundary defined by an exhaust diffuser shell. The outer boundary diverges radially outward at a predetermined angle and is radially spaced from the inner boundary so that an annular flow path for guiding an exhaust gas flow in an axial direction is defined therebetween. A source of compressed fluid is additionally provided. A plurality of strut structures are provided, each having a radially directed axis extending between the inner and outer boundaries. The flow passage further includes a pair of radially opposing, spaced aerodynamic surfaces forming a flow control vane having a chord length extending in the axial direction, and leading and trailing edges at opposing ends of the chord length. The flow control vane is affixed to and extends between the strut structures. The flow control vane defines a ring located between the inner and outer boundaries and receives fluid from the source of compressed fluid. First and second fluid discharge slots are provided for discharging the compressed fluid from the trailing edges of the spaced aerodynamic surfaces, and a fluid control surface is adjacent to the fluid discharge slots. The control surface extends beyond the trailing edges of the spaced aerodynamic surfaces and has curved trailing edge portions adjacent each of the slots forming a Coanda surface. The flow control slots are selectively provided with the compressed fluid from the source of compressed fluid to produce a Coanda effect along the control surface, the Coanda effect having a component in the radial direction effecting a turning of the exhaust gas flow in the flow path radially inward or outward toward one of the inner and outer boundaries.

The source of compressed fluid may be located outside of the flow passage, and a plenum may be located within the vane in fluid communication with the source of compressed fluid and provide a flow of the compressed fluid to the fluid discharge slots, and the first and second fluid discharge slots may be located in fluid communication with the plenum to selectively provide at least a majority of a compressed fluid flow to one of the first and second fluid discharge slots.

A plurality of the flow control vanes may be provided defining a plurality of rings located in radially spaced relation to each other between the inner and outer boundaries. Each flow control vane may have first and second fluid discharge slots, on respective radially outward and inward facing sides of the vane, in fluid communication with the source of compressed air, and may include a fluid control surface defining a Coanda surface adjacent respective ones of the first and second fluid discharge slots. A first one of the flow control vanes may comprise a radially inner vane that may provide a Coanda effect flow to draw the fluid flow radially inward toward the inner boundary, and a second one of the flow control vanes may comprise a radially outer vane that may provide a Coanda effect flow to draw the fluid flow toward the outer boundary.

The inner boundary may include a tail cone located at a downstream end of the diffuser hub. The tail cone may have a conical surface tapering radially inward toward a central axis of the flow path, and the trailing edge of the flow control vane may be substantially aligned, in the axial direction, with at least a portion of the tail cone.

In accordance with yet another aspect of the invention, a method of exhaust diffusion in a turbine engine is provided comprising: providing a turbine engine having a turbine section and an exhaust diffuser section, the exhaust diffuser section including an inner boundary defined at least by a hub structure comprising at least a hub and a tail cone, the hub having an upstream end and a downstream end, the tail cone having an upstream end located adjacent the downstream end of the hub and a downstream end, and the tail cone tapering radially inward toward an axis of the diffuser, the exhaust diffuser section further including an outer boundary radially spaced from the inner boundary so that a flow path is defined therebetween; supplying a turbine exhaust gas flow to the flow path; and providing a flow of fluid from a source of compressed fluid to a vane located between the inner and outer boundaries, the flow of fluid flowing in a Coanda effect along a Coanda surface to entrain a portion of the exhaust gas flow to effect a biasing of the exhaust gas flow toward at least one of the inner and outer boundaries.

The vane may include first and second fluid discharge slots, and the method may alternately: provide a majority of the flow fluid from one of the first and second fluid discharge slots to cause a flow along the Coanda surface in a first direction toward the inner boundary; and provide a majority of the flow fluid from the other of the first and second fluid discharge slots to cause a flow along the Coanda surface in a second direction toward the outer boundary.

The vane may comprise a first vane adjacent to the inner boundary, and at least a second vane radially outward from the first vane. The second vane may be located adjacent to the outer boundary and may receive a flow of fluid from the source of compressed air flowing along a further Coanda surface, and method may further include simultaneously:

1) providing the flow from the first vane to effect the biasing of the exhaust gas flow radially inward toward the inner boundary; and 2) providing the flow from the second vane to effect a biasing of the exhaust flow radially outward toward the outer boundary.

Alternatively, the flow of fluid over the Coanda surfaces may be provided such that the exhaust flow at both the first and second vanes is biased in the same radial direction.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Embodiments of the invention are directed to an exhaust diffuser system, which can increase the power and efficiency of a gas turbine engine. Aspects of the invention will be explained in connection with various possible configurations, but the detailed description is intended only as exemplary. Aspects of the invention are shown in FIGS. 2-5, but the present invention is not limited to the illustrated structure or application.

Figure 1:
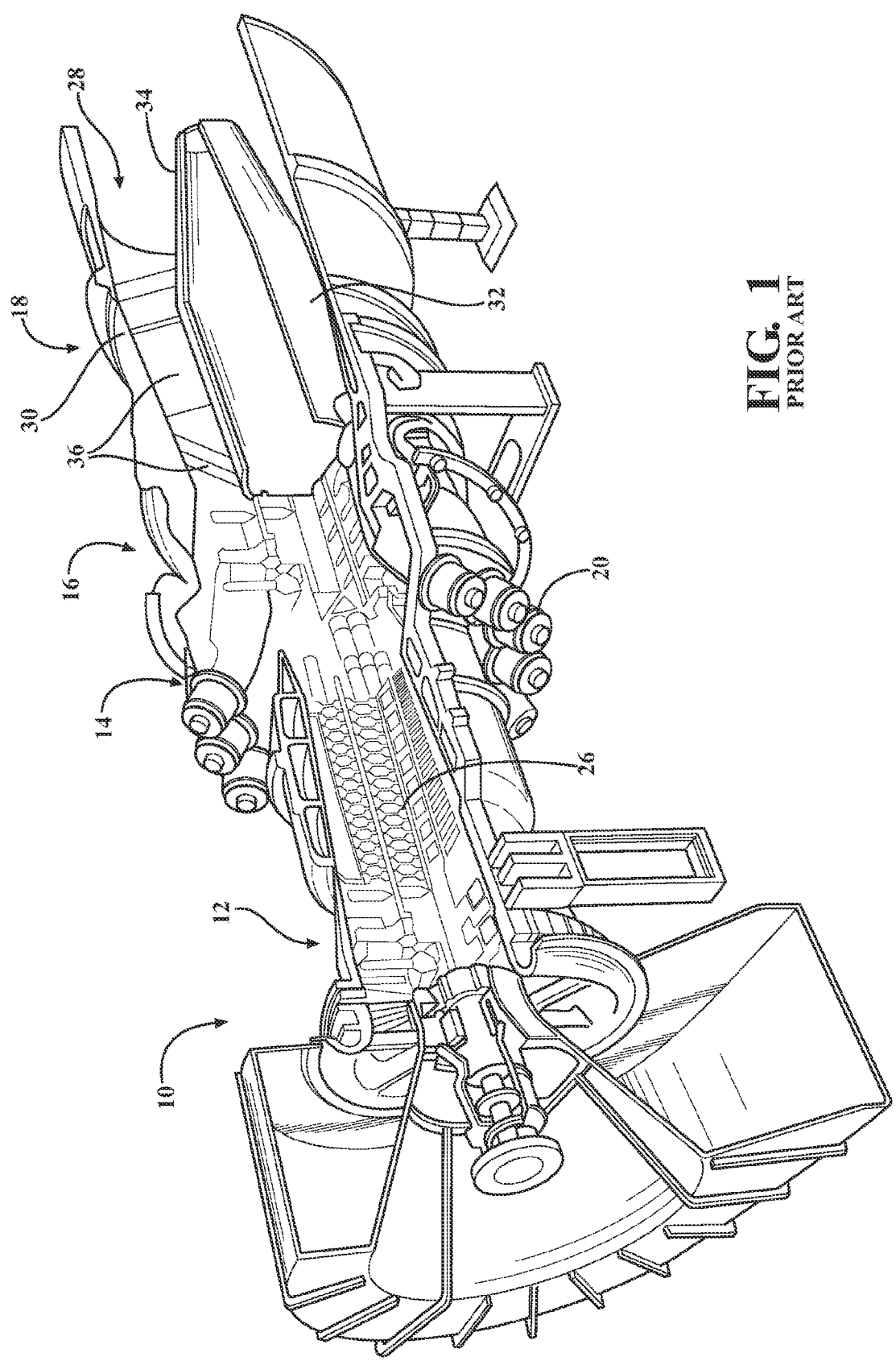
FIG. 1 is a perspective view partially in cross-section of a known turbine engine.
Figure 2:
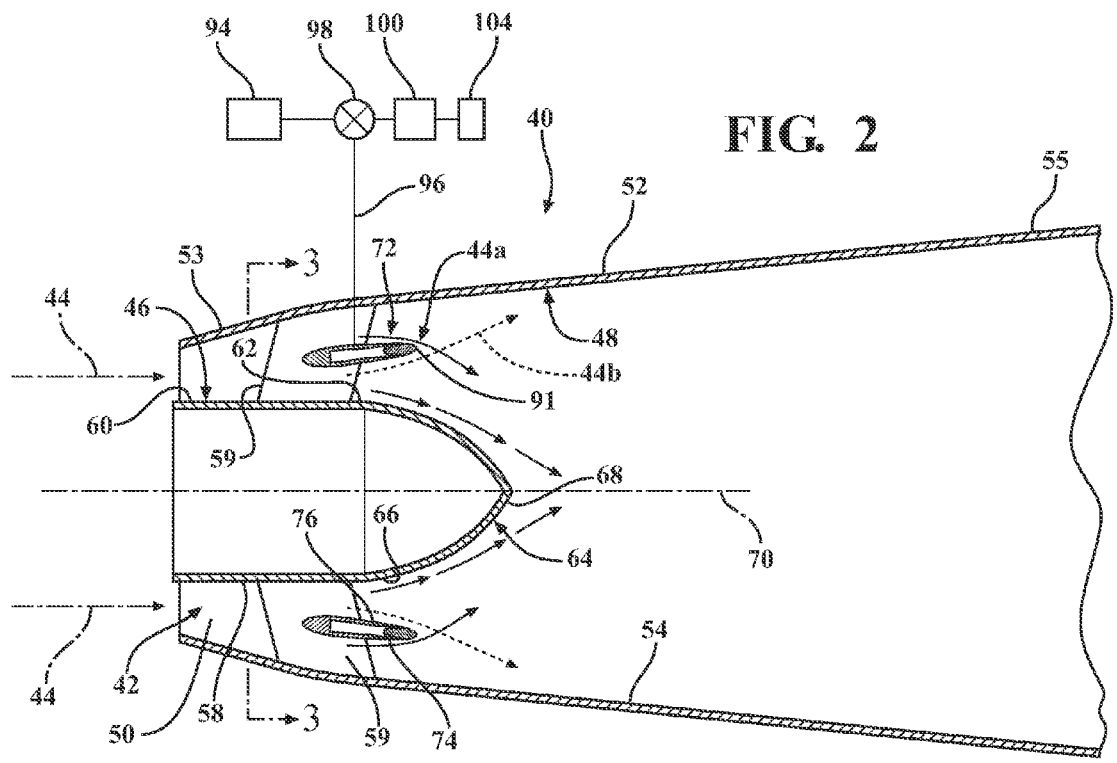
FIG. 2 is a side elevation cross-sectional view of an exhaust diffuser section of a turbine engine configured in accordance with aspects of the invention.
Figure 3:
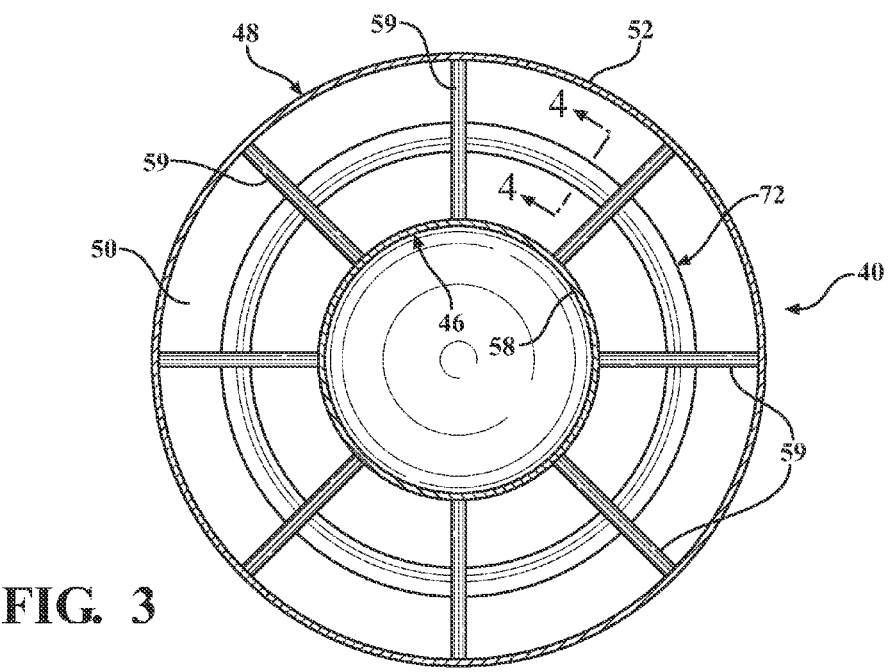
FIG. 3 is a cross-sectional view of the exhaust diffuser section taken along line 3-3 in FIG. 2.

FIG. 2 shows a portion of an exhaust diffuser system 40 of a gas turbine engine configured in accordance with aspects of the invention. The exhaust diffuser 40 is downstream of and in fluid communication with a turbine section (not shown) of the engine. The exhaust diffuser 40 has an inlet 42 that can receive an exhaust flow or exhaust gases 44 exiting from the turbine section. The exhaust diffuser 40 can include an inner boundary 46 or hub structure and an outer boundary 48. The outer boundary 48 is radially spaced from the inner boundary 46 such that a flow path 50 is defined between the inner and outer boundaries 46, 48. The flow path 50 can be generally annular or can have any other suitable configuration.

The outer boundary 48 is shown as comprising a diffuser shell 52 having an inner peripheral surface 54 defining the outer boundary 48 of the flow path 50. The diffuser shell 52 can define the axial length (only a portion of which is shown in FIG. 2) of the exhaust diffuser 40. The axial length can extend from an upstream end 53 to a downstream end 55 of the diffuser shell 52.

The inner boundary 46 can be defined by a center body, also referred to as a hub 58. The hub 58 may be generally cylindrical and may include an upstream end 60 and a downstream end 62. The terms "upstream" and "downstream" are intended to refer to the general position of these items relative to the direction of fluid flow through the exhaust diffuser section 40. The hub 58 can be connected to the diffuser shell 52 by a plurality of radially extending strut structures 59, that may comprise struts surrounded by strut liners, which can be arranged in circumferential alignment in a row, as may be seen in FIG. 3.

Referring to FIG. 2, the inner boundary 46 may also be defined by a tail cone 64. The tail cone 64 can have an upstream end 66 and a downstream end 68, wherein the upstream end 66 of the tail cone 64 may be attached to the downstream end 62 of the hub 58 in any suitable manner. Preferably, the tail cone 64 tapers from the upstream end 66 to the downstream end 68 in as short of an axial distance as possible. The hub 58 and the tail cone 64 can be substantially concentric with the diffuser shell 52 and can share a common longitudinal axis 70, corresponding to a central axis for the flow path 50. The inner surface 54 of the diffuser shell 52 is oriented to diverge from the longitudinal axis 70 in the downstream direction, such that at least a portion of the flow path 50 is generally conical.

Figure 4:
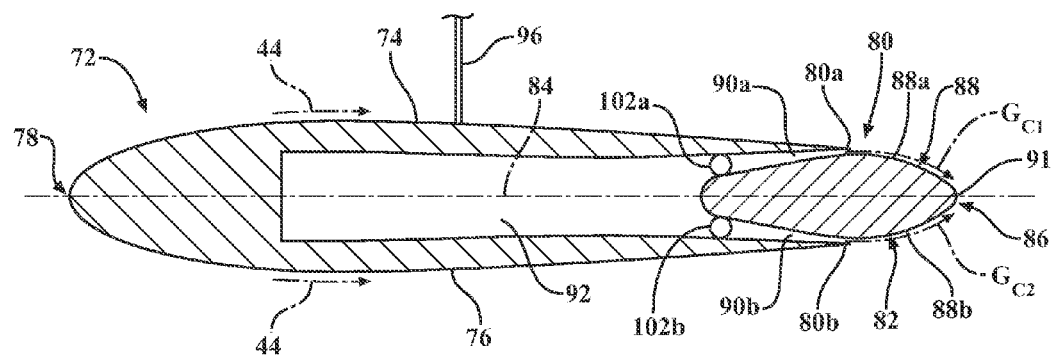
FIG. 4 is a cross-sectional view of a flow control vane taken along line 4-4 in FIG. 3.

Referring to FIGS. 2 and 4, in accordance with an aspect of the invention, a flow control vane 72 may be provided at a radial location between the inner and outer boundaries 46, 48. The flow control vane 72 includes a pair of radially opposing, spaced aerodynamic surfaces comprising a radially outward facing surface 74 and a radially inward facing surface 76. The aerodynamic surfaces 74, 76 have a chord length extending in the axial direction between opposing leading and trailing edges 78, 80. It may be noted that the trailing edge 80 of the aerodynamic surfaces 74, 76 comprises respective edges 80a, 80b spaced from each other to define a fluid discharge opening 82 therebetween.

In accordance with an aspect of the invention, the flow control vane 72 may be affixed to and extend between the strut structures 59 wherein the vane 72 intersects opposing lateral sides of the strut structures 59. Hence, the flow control vane 72 may define a ring located between the inner and outer boundaries 46, 48. Further, a chordal axis 84 extending between the leading and trailing edges 78, 80 of the flow control vane 72 may be oriented at an angle generally matching the diverging orientation of the inner surface 54 of the diffuser shell 52, such that the flow control vane 72 may comprise a conical vane within the flow path 50.

It should be understood that, although the flow control vane 72 is described as being supported on the radial structure comprising the strut structures 59, the present invention need not be limited to such structure and other radial structures may be used to support the flow control vane 72 at a desired radial location within the flow path 50.

As seen in FIG. 4, a fluid control body 86 defining a fluid control surface 88 is provided adjacent to the trailing edges 80a, 80b of the surfaces 74, 76 and may extend axially into the fluid discharge opening 82. The fluid control surface 88 comprises a first, radially outward facing side 88a and a second, radially inward facing side 88b. The trailing edges 80a, 80b and radially facing sides 88a, 88b of the control body 86 may define respective slots 90a, 90b therebetween. The slots 90a, 90b comprise fluid discharge openings on opposing sides of the vane 72 defined by the respective radially facing surfaces 74, 76. More particularly, the slots 90a, 90b form Coanda jets for producing a Coanda effect along the radially facing sides 88a, 88b.

The radially facing sides 88a, 88b of the fluid control body 86 extend axially downstream from the trailing edge opening 82 of the vane 72, defining trailing edge portions of the vane 72, and are provided with a curvature to direct a Coanda effect flow produced along the sides 88a, 88b, as is described further below. The sides 88a, 88b are illustrated in FIG. 4 as converging to a point at a trailing edge 91 of the vane 72, however, it should be understood that the trailing edge 91 may be provided with other configurations, such as a radiused transition formed between the sides 88a, 88b. The surfaces 74, 76 of the vane 72 and the sides 88a, 88b of the fluid control body 86 may be formed generally symmetrically about a plane having a dimension defined in the axial direction by the chordal axis 84 of the vane 72.

A plenum 92 (FIG. 4) may be defined within the vane 72 for receiving a compressed fluid from a source of compressed fluid, represented diagrammatically by 94 in FIG. 2, located outside of the flow passage 50. The compressed fluid may be provided to the plenum 92 through one or more supply lines 96, which may extend through one or more of the strut structures 59 to the vane 72. The source of compressed fluid 94 may provide a flow of gas, such as air. The source of compressed fluid 94 may be any supply of gas including, for example, a bleed off of air from the compressor section of the turbine engine, combustion gas from further downstream in the diffuser, and/or a separate supply of gas external to the turbine engine. The mass flow of the compressed fluid or gas flow provided to the plenum 92 from the source of compressed fluid 94 through the supply line 96 may be varied, depending on predetermined operating conditions, such as by control of a valve 98 which may be controlled by a system controller 100 for the turbine engine, as described further below.

A flow of compressed fluid, i.e., a gas flow, may be directed from the plenum 92 to the slots 90a, 90b, and the gas flow to the slots 90a, 90b may be controlled such that one or the other of slots 90a, 90b receives all or a majority of the gas flow. Control of the gas flow to the slots 90a, 90b is depicted diagrammatically by respective valve structures 102a, 102b, which could be controlled by the controller 100 to either increase or decrease the flow to the individual slots 90a, 90b. In accordance with an aspect of the invention, the valve structures 102a, 102b could be selectively controlled to alternately provide a majority of the gas flow to either the slot 90a or the slot 90b, and the gas flow exits the slots 90a, 90b as Coanda jet flows $G_{C1}$, $G_{C2}$. Additional configurations for providing a controlled Coanda flow at a trailing edge of a vane are described in U.S. Pat. No. 4,682,746, which patent is incorporated by reference in its entirety.

Alternatively, and without limitation, the gas flow from the plenum 92 may be controlled by providing a movement of the fluid control body 86 relative to the trailing edges 80a, 80b of the surfaces 74, 76. For example, the control body 86 could be supported for movement in the radial direction, such as by pivotal movement or radial translation of the control body 86, to position the sides 88a, 88b of the flow control surface 88 closer to or farther from the respective trailing edges 80a, 80b. In accordance with aspects of the invention in which the flow control body 86 may be movable relative to the trailing edges 80a, 80b, the configuration of the sides 88a, 88b of the flow control body 86, such as the curvature of the sides 88a, 88b, may be formed with reference to any pivoting or other changes of orientation of the control body 86 relative to gas flows from the plenum 92 in order to maintain a Coanda effect flow along the sides 88a, 88b of the flow control body 86.

It should be understood that the present invention is not limited to a particular structure for controlling gas flow to the slots 90a, 90b, and such control may be provided either within the diffuser shell 52, i.e., at the location of the vane 72, or may be provided external to the diffuser shell 52. For example, a control external to the diffuser shell 52 may include separate supply lines (not shown) and corresponding plenums for each of the slots 90a, 90b, where gas flow to the separate supply lines may be controlled by valve structure or other means located external to the diffuser shell 52.

Each of the sides 88a, 88b of the fluid control surface 88 may cooperate with an adjacent slot 90a, 90b to provide a Coanda flow. For example, the radially outer slot 90a may provide a majority or major portion of a gas flow $G_{C1}$ from the plenum 92 comprising a jet of gas exiting the slot 90a generally tangentially to an upstream portion of the radially outer side 88a of the fluid control body 86, and at a velocity sufficient to produce a Coanda effect. The jet flow $G_{C1}$ producing the Coanda effect additionally entrains and accelerates at least a portion of the exhaust gases 44 flowing over the radially outward facing surface 74 to cause the flow to turn radially inward in substantially attached flow around the curvature of the side 88a of the flow control body 86, as depicted by flow lines 44a in FIG. 2. As used herein, "Coanda effect" refers to the effect observed by Henri Coanda in the 1930's of the tendency of a relatively high speed jet of fluid flowing tangentially along a curved or inclined surface to follow the surface along the curve or incline.

The jet flow $G_{C1}$ from the slot 90a and entrained exhaust gases 44 effects a turning of the flow of the exhaust gases 44 drawing the exhaust flow radially inward toward the inner boundary 46. The vane 72 may be located such that the trailing edge 91 is located substantially aligned, in the axial direction, with at least a portion of the tail cone 64, and may be supported adjacent to trailing edge portions of the strut structures 59. In particular, the vane 72 is preferably located to provide an inward biasing of the exhaust gas flow as it passes from the hub 58 to the downstream end 68 of the tail cone 64, increasing the flow velocity at the inner boundary 46. The increased flow velocity provided by the Coanda flow to the inner boundary 46 may effect an increase in the strength of the flow along the hub 58 and tail cone 64 for effecting an improved closure of the wake at the downstream end 68 of the tail cone 64. Hence, the improved flow following the contour of the tail cone 64 may permit a diffuser design that incorporates a more sharply tapered tail cone 64 or a truncated tail cone 64 without creating significant flow separations. Also, improving the strength of the flow at the hub 58 and tail cone 64 may facilitate designs that permit an increase in the angle of the diverging diffuser shell 52, to achieve a reduction in the overall length of the exhaust diffuser 40.

In accordance with a further aspect of the invention, an additional gas flow may be provided from the plenum 92 to the radially inner slot 90b, wherein a majority or major portion of the gas flow from the plenum 92 may be provided to exit the radially outer slot 90a to provide a Coanda effect, as described above, and a lesser amount of gas flow may be provided to the radially inner slot 90b. The lesser flow to the slot 90b may be provided, for example, to facilitate flow of the exhaust gases 44 along the radially inward facing surface 76 downstream past the slot 90b, e.g., to prevent entry of exhaust gases 44 into the slot 90b, and is preferably a sufficiently low flow rate to not adversely affect the radially inward Coanda flow provided by the radially outer slot 90a.

Further, in response to some flow conditions of the exhaust flow 44 entering the exhaust diffuser 40, the radially inner slot 90b may be provided with a majority or major portion of the gas flow $G_{C2}$ from the plenum 92 comprising a jet of gas exiting the slot 90b generally tangentially to an upstream portion of the radially inner side 88b of the fluid control body 86, and at a velocity sufficient to produce a Coanda effect along the radially inward facing side 88b of the fluid control body 86. The jet flow $G_{C2}$ from the slot 90b entrains and accelerates at least a portion of the exhaust gases 44 flowing over the radially inward facing surface 76 to cause the flow to turn radially outward in substantially attached flow around the curvature of the side 88b of the flow control body 86, as depicted by dotted flow lines 44b in FIG. 2. In this case, a lesser amount of gas flow may be provided to the radially outer slot 90a. The lesser flow to the slot 90a may be provided, for example, to facilitate flow of the exhaust gases 44 along the radially outward facing surface 74 downstream past the slot 90a, e.g., to prevent entry of exhaust gases 44 into the slot 90a, and is preferably a sufficiently low flow rate to not adversely affect the radially outward Coanda flow provided by the radially inner slot 90b.

The particular radial direction toward which the exhaust gas flow 44 is biased by the Coanda effect of the vane 72, and the strength of the Coanda effect provided by the jet flow $G_{C1}$ or $G_{C2}$, may be controlled based on various conditions affecting the flow profile of the exhaust gases 44. That is, in addition to facilitating an efficient design of the exhaust diffuser 40, the Coanda flow from the slots 90a, 90b may be used to optimize flow characteristics or offset non-uniformity in the profile of the flow entering the exhaust diffuser 40, such as may be caused by changes in the ambient inlet conditions. For example, for warmer inlet temperatures, e.g., on hotter days, the exhaust flow 44 adjacent to the hub 58 and tail cone 64 may be weak, and it may be desirable to increase the strength of the jet flow $G_{C1}$ through the radially outer slot 90a to increase the Coanda effect for biasing the exhaust flow 44 toward the tail cone 64. Alternatively, for cooler inlet temperatures, e.g., on cooler days, the exhaust flow 44 adjacent to the hub 58 and tail cone 64 may be strong, and it may be desirable to provide the Coanda effect in the radially outward direction, by directing the majority of gas flow from the plenum 92 to the radially inner slot 90b to produce the Coanda effect with the jet flow $G_{C2}$ along the radially inner side 88b of the fluid control body 86 for biasing the exhaust flow 44 radially outward toward the diffuser shell 52. Biasing the exhaust flow toward the diffuser shell 52 can operate to energize the flow along the inner peripheral surface 54 of the diffuser shell 52 and offset the tendency of the exhaust flow 44 to separate from the inner peripheral surface 54.

In addition, during off-design conditions, due either to changes in ambient temperature, such as an ambient air temperature that may be measured at a sensor 104, or a change in the power output of the turbine engine, the flow will also tend to have more swirl than at design conditions, with a corresponding non-uniform velocity profile of the exhaust gas flow between the inner boundary 46 and the outer boundary 48. The swirl may act to pull flow away from the inner boundary 46 which would then require a Coanda flow from the radially outer slot 90a along the radially outer side 88a of the fluid control body 86 to compensate for this, and in some cases may require an increase in flow from the slot 90a. Other non-uniform flow conditions may require a Coanda flow from the radially inner slot 90b.

As the velocity of the Coanda jet flow $G_{C1}$, $G_{C2}$ is increased across the respective slot 90a, 90b, the performance of the jet flow $G_{C1}$, $G_{C2}$ to draw the flow of exhaust gas 44 radially inward or radially outward increases. The mass flow of gas $G_{C1}$, $G_{C2}$ provided by either of the slots 90a, 90b is preferably within a range of about 1% to about 2% of the mass flow of gas comprising the exhaust flow 44 passing through the flow path 50. Further, the jet flow $G_{C1}$, $G_{C2}$ from either of the slots 90a, 90b is preferably discharged at a velocity that is greater than a velocity of the exhaust flow 44 in the diffuser section 40.

The controller 100 may operate to automatically change the Coanda effect provided by the slots 90a, 90b to optimize the flow characteristics through the diffuser section 40 to improve the efficiency of the turbine engine by effecting a variation in the affect of the inner boundary 46 relative to the affect of the outer boundary 48 while operating with a fixed geometry for the inner and outer boundaries 46, 48. Further, the flow control provided by aspects of the invention enable radially biasing the exhaust flow 44 through the diffuser section 40 without requiring movable components located in the exhaust flow 44, since the jet flow from the plenum 92 through the slots 90a, 90b may be controlled by valving within the vane 72.

Figure 5:
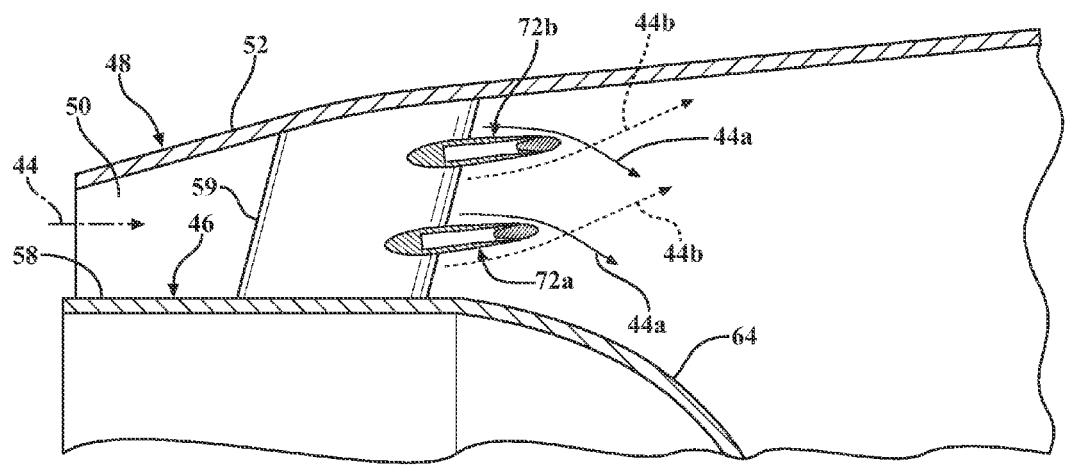
FIG. 5 is a side elevation cross-sectional view of an exhaust diffuser section of a turbine engine configured in accordance with further aspects of the invention.

Further aspects of the invention are illustrated in FIG. 5, in which a first, radially inner flow control vane 72a and a second, radially outer flow control vane 72b are illustrated supported on the structures 59 at respective first and second radial locations between the inner and outer boundaries 46, 48. The first and second flow control vanes 72a, 72b may comprise circumferential Coanda vane structures that may be configured and operated generally the same as the flow control vane 72 described with reference to FIGS. 2-4. Further, one or both of the flow control vanes 72a, 72b may comprise conical vanes that may be angled radially outward at an angle generally parallel to the diverging angle of the diffuser shell 52.

The jet flows, comprising Coanda jets, from each of the vanes 72a, 72b may be individually controlled for each vane 72a, 72b to provide a desired direction and strength of flow at each vane 72a, 72b, and which may be controlled with reference to the flow profile of the exhaust flow 44 entering the exhaust diffuser 40. In one application of the Coanda effect jet flows provided by the vanes 72a, 72b, the exhaust flow may be biased at both of the vanes 72a, 72b to flow radially inward, illustrated by the solid arrows 44a at each of the vanes 72a, 72b. The radially inward flow at both of the vanes 72a, 72b may be effected to offset a weak flow at the inner boundary 46 and a corresponding strong flow at the outer boundary 48, in order to minimize wake losses extending downstream from the tail cone 64.

In another application of the Coanda effect jet flows provided by the vanes 72a, 72b, the exhaust flow may be biased at both of the vanes 72a, 72b to flow radially outward, illustrated by dotted arrows 44b at each of the vanes 72a, 72b. The radially outward flow at both of the vanes 72a, 72b may be effected to offset a strong flow at the inner boundary 46 and a corresponding weak flow at the outer boundary 48.

In a further application of the Coanda effect jet flows provided by the vanes 72a, 72b, the exhaust flow may be radially biased toward the nearest boundary relative to each vane. In particular, the radially inner vane 72a may bias the exhaust flow radially inward toward the inner boundary 46, as illustrated by the solid arrow 44a at the vane 72a, and the radially outer vane 72b may bias the exhaust flow radially outward toward the outer boundary 48, as illustrated by the dotted arrow 44b at the vane 72b.

It should be understood that FIG. 5 illustrates only one configuration including multiple flow control vanes 72a, 72b, and that additional flow control vanes may be provided to obtain a desired degree of control over the profile of the exhaust flow 44. The multiple flow control vanes 72a, 72b provide additional control over the flow turning capabilities of the vanes, to maintain efficient flow distributions at both the inner and outer boundaries 46, 48 over a broad range of operating conditions, and provide additional options for exhaust diffusers having stronger diffuser inlet flow profiles.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A flow passage for an axial flow machine comprising:
   an inner boundary;
   an outer boundary radially spaced from said inner boundary so that an annular flow path for guiding a fluid flow in an axial direction is defined therebetween;
   a source of compressed fluid;
   a flow control vane including leading and trailing edges, said vane supported at a radial location between said inner and outer boundaries, wherein said vane is supported on a strut structure and said strut structure extends from said inner boundary to said outer boundary and includes laterally opposing sides, and said flow control vane intersects said laterally opposing sides of said strut structure;

a fluid discharge opening for discharging a flow of the compressed fluid from said trailing edge;

a fluid control surface adjacent to said fluid discharge opening and extending in the axial direction at said trailing edge of said vane, said fluid control surface having a curved trailing edge forming a Coanda surface; and said fluid discharge opening being selectively provided with the compressed fluid from said source of compressed fluid to produce a Coanda effect along said control surface, the Coanda effect having a component in the radial direction effecting a turning of the fluid flow in said flow path radially inward or outward toward one of said inner and outer boundaries.

2. The flow passage of claim 1, wherein said source of compressed fluid is located outside of said flow passage, and including a plenum located within said vane in fluid communication with said source of compressed fluid and providing a flow of the compressed fluid to said fluid discharge opening.

3. The flow passage of claim 2, wherein said vane extends circumferentially within said flow path, and said fluid discharge opening comprises:

a first fluid discharge opening located on a radially outward facing side of said vane;

a second fluid discharge opening located on a radially inward facing side of said vane;

said first and second fluid discharge openings being located adjacent to respective radially facing sides of said fluid control surface; and said first and second fluid discharge openings being located in fluid communication with said plenum to selectively provide a majority of a compressed fluid flow to either one of said first and second fluid discharge openings.

4. The flow passage of claim 3, wherein:

when the majority of compressed fluid flow is provided to said first fluid discharge opening, said Coanda effect along said control surface effects a radial inward turning of the fluid flow in said flow path; and when the majority of compressed fluid flow is provided to said second fluid discharge opening, said Coanda effect along said control surface effects a radial outward turning of the fluid flow in said flow path.

5. The flow passage of claim 1, wherein said fluid control surface comprises opposing first and second radially facing portions that are generally symmetrical about a plane extending axially from said leading edge to said trailing edge of said vane.

6. The flow passage of claim 1, wherein said flow control vane comprises a first flow control vane and said radial location comprises a first radial location, and including a second flow control vane located at a second radial location, radially outward from said first vane, between said inner and outer boundaries.

7. The flow passage of claim 6, wherein said outer boundary diverges at a predetermined angle, and at least one of said first and second control vanes defines a chordal axis between said leading edge and said trailing edge, said chordal axis oriented in a direction generally parallel to said predetermined angle.

8. The flow passage of claim 1, wherein said inner boundary includes a tail cone having a conical surface tapering radially inward toward a central axis of said flow path, said trailing edge of said flow control vane being substantially aligned, in the axial direction, with at least a portion of said tail cone.

9. A flow passage comprising an exhaust diffuser in a gas turbine engine, the flow passage comprising:

an inner boundary defined by an exhaust diffuser hub;

an outer boundary defined by an exhaust diffuser shell, said outer boundary diverging radially outward at a predetermined angle and being radially spaced from said inner boundary so that an annular flow path for guiding an exhaust gas flow in an axial direction is defined therebetween;

a source of compressed fluid;

a plurality of strut structures, each having a radially directed axis extending between said inner and outer boundaries;

a pair of radially opposing, spaced aerodynamic surfaces forming a flow control vane having a chord length extending in the axial direction, and leading and trailing edges at opposing ends of said chord length;

said flow control vane being affixed to and extending between said strut structures, said flow control vane defining a ring located between said inner and outer boundaries and receiving fluid from said source of compressed fluid;

first and second fluid discharge slots for discharging the compressed fluid from said trailing edge;

a fluid control surface adjacent to said fluid discharge slots, said control surface extending beyond said trailing edge of said vane and having curved trailing edge portions adjacent each of said slots forming a Coanda surface; and said flow control slots being selectively provided with the compressed fluid from said source of compressed fluid to produce a Coanda effect along said control surface, the Coanda effect having a component in the radial direction effecting a turning of the exhaust gas flow in said flow path radially inward or outward toward one of said inner and outer boundaries.

10. The flow passage of claim 9, wherein:

said source of compressed fluid is located outside of said flow passage, and including a plenum located within said vane in fluid communication with said source of compressed fluid and providing a flow of the compressed fluid to said fluid discharge slots; and said first and second fluid discharge slots being located in fluid communication with said plenum to selectively provide at least a majority of a compressed fluid flow to one of said first and second fluid discharge slots.

11. The flow passage of claim 9, including a plurality of said flow control vanes defining a plurality of rings located in radially spaced relation to each other between said inner and outer boundaries, each said flow control vane having first and second fluid discharge slots, on respective radially outward and inward facing sides of said vane, in fluid communication with said source of compressed air and a fluid control surface defining a Coanda surface adjacent respective ones of said first and second fluid discharge slots.

12. The flow passage of claim 11, wherein a first one of said flow control vanes comprises a radially inner vane providing a Coanda effect flow to draw the fluid flow radially inward toward said inner boundary, and a second one of said flow control vanes comprises a radially outer vane providing a Coanda effect flow to draw the fluid flow toward said outer boundary.

13. The flow passage of claim 9, wherein said inner boundary includes a tail cone located at a downstream end of said diffuser hub.

14. The flow passage of claim 9, wherein said tail cone has a conical surface tapering radially inward toward a central axis of said flow path, said trailing edge of said flow control vane being substantially aligned, in the axial direction, with at least a portion of said tail cone.

15. A method of exhaust diffusion in a turbine engine comprising:
   providing a turbine engine having a turbine section and an exhaust diffuser section, the exhaust diffuser section including an inner boundary defined at least by a hub structure comprising at least a hub and a tail cone, the hub having an upstream end and a downstream end, the tail cone having an upstream end located adjacent the downstream end of the hub and a downstream end, and the tail cone tapering radially inward toward an axis of the diffuser, the exhaust diffuser section further including an outer boundary radially spaced from the inner boundary so that a flow path is defined therebetween;
   supplying a turbine exhaust gas flow to the flow path;
   providing a flow of fluid from a source of compressed fluid to a vane located between the inner and outer boundaries, the flow of fluid flowing in a Coanda effect along a Coanda surface to entrain a portion of the exhaust gas flow to effect a biasing of the exhaust gas flow toward at least one of the inner and outer boundaries; and
   wherein the vane includes first and second fluid discharge slots, and including alternately:
      providing a majority of the flow fluid from one of the first and second fluid discharge slots to cause a flow along the Coanda surface in a first direction toward the inner boundary; and
      providing a majority of the flow fluid from the other of the first and second fluid discharge slots to cause a flow along the Coanda surface in a second direction toward the outer boundary.

16. The method of claim 15, wherein the vane comprises a first vane adjacent to the inner boundary, and including at least a second vane radially outward from the first vane and adjacent to the outer boundary, and receiving a flow of fluid from the source of compressed air flowing along a further Coanda surface, and including simultaneously:
   1) providing the flow from the first vane to effect the biasing of the exhaust gas flow radially inward toward the inner boundary; and
   2) providing the flow from the second vane to effect a biasing of the exhaust flow radially outward toward the outer boundary.

17. The method of claim 15, wherein the vane comprises a first vane adjacent to the inner boundary, and including at least a second vane radially outward from the first vane and adjacent to the outer boundary, and receiving a flow of fluid from the source of compressed air flow along a further Coanda surface and including:
   providing the flow of fluid over the Coanda surfaces such that the exhaust flow at both the first and second vanes is biased in the same radial direction.

* * * * *